US009473969B2

(12) United States Patent
Li et al.

(10) Patent No.: US 9,473,969 B2
(45) Date of Patent: Oct. 18, 2016

(54) SPECTRUM SENSING

(75) Inventors: Haitao Li, Beijing (CN); Haipeng Lei, Beijing (CN); Kodo Shu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 10 days.

(21) Appl. No.: 14/351,836

(22) PCT Filed: Oct. 26, 2011

(86) PCT No.: PCT/CN2011/081314
§ 371 (c)(1),
(2), (4) Date: Apr. 14, 2014

(87) PCT Pub. No.: WO2013/059996
PCT Pub. Date: May 2, 2013

(65) Prior Publication Data
US 2014/0287693 A1 Sep. 25, 2014

(51) Int. Cl.
H04W 24/10 (2009.01)
H04W 16/14 (2009.01)
(52) U.S. Cl.
CPC ............. *H04W 24/10* (2013.01); *H04W 16/14* (2013.01)
(58) Field of Classification Search
CPC .............................. H04W 16/14; H04W 24/10
See application file for complete search history.

(56) References Cited

U.S. PATENT DOCUMENTS

| 8,004,995 | B2 | 8/2011 | Hyon et al. | |
|---|---|---|---|---|
| 2010/0166102 | A1* | 7/2010 | Seyedi-Esfahani | 375/295 |
| 2013/0003591 | A1* | 1/2013 | Novak et al. | 370/252 |
| 2013/0231124 | A1* | 9/2013 | Vrzic et al. | 455/452.1 |
| 2013/0294356 | A1* | 11/2013 | Bala et al. | 370/329 |
| 2014/0031054 | A1* | 1/2014 | Zou et al. | 455/452.2 |
| 2014/0079016 | A1* | 3/2014 | Dai et al. | 370/330 |

FOREIGN PATENT DOCUMENTS

| CN | 101184324 A | 5/2008 |
|---|---|---|
| CN | 101902251 A | 12/2010 |
| CN | 102123428 A | 7/2011 |
| CN | 102223191 | 10/2011 |
| WO | 2007/133395 A2 | 11/2007 |
| WO | 2011124744 | 10/2011 |

OTHER PUBLICATIONS

Chien et al., "Cooperative Partial Spectrum Sensing With Frequency Diversity for Cognitive Radio", International Symposium on Intelligent Signal Processing and Communication Systems, Dec. 7-9, 2009, pp. 546-549.

Hoang et al., "Opportunistic Spectrum Access for Energy-Constrained Cognitive Radios", IEEE Transactions on Wireless Communications, vol. 8, Issue 3, Mar. 2009, pp. 1206-1211.

International Search Report received for corresponding Patent Cooperation Treaty Application No. PCT/CN2011/081314, dated Jul. 17, 2012, 3 pages.

* cited by examiner

*Primary Examiner* — David Bilodeau
(74) *Attorney, Agent, or Firm* — Mintz Levin Cohn Ferris Glovsky and Popeo, P.C.

(57) ABSTRACT

Provided are methods, corresponding apparatuses, and computer program products for performing spectrum sensing on a spectrum. A method comprises receiving, at a user equipment, information regarding performing spectrum sensing from a base station; performing, based upon the information, the spectrum sensing by the user equipment in an idle mode; and transmitting, by the user equipment out of the idle mode, to the base station a result of the spectrum sensing. With the claimed inventions, transmission interruption caused by non-idle user equipments performing the spectrum sensing would be eliminated.

19 Claims, 5 Drawing Sheets

SPECTRUM SENSING

RELATED APPLICATION

This application was originally filed as PCT Application No. PCT/CN2011/081314 filed Oct. 26, 2011.

FIELD OF THE INVENTION

Embodiments of the present invention generally relate to wireless communication techniques including the 3GPP (the 3rd Generation Partnership Project) LTE (Long Term Evolution) technique. More particularly, embodiments of the present invention relate to methods, apparatuses, and computer program products for performing spectrum sensing on a spectrum.

BACKGROUND OF THE INVENTION

Due to the technical benefit that a local area radio network extends the coverage area of a radio system and facilitates easy access of a user equipment to a core network, LTE radio systems have kept focusing on developments of the local area radio networks (also known as LTE-LANs for short) consisted of for example picocells or femtocells (also known as home-eNB cells) that operate in licensed spectra. To improve use-efficiency of the finite and increasingly crowded spectrum and decrease spectral costs, a few approaches for shared use of the spectrum have been recommended or applied, which for example include "ASA" as jointly recommended by Nokia and Qualcomm and use of license-exempt spectra such as a TV white space spectrum. For a better understanding of the LTE-LAN and its spectral usage involving a license-exempt spectrum, discussion will be made under a scenario as illustrated in FIG. 1.

FIG. 1 exemplarily illustrates a scenario 100 including a LTE-LAN network and a TV network. As illustrated in FIG. 1, the LTE-LAN network includes an LTE-LAN BS, e.g., FBS or PBS, and LTE-LAN UEs 1 and 2, e.g., FUEs or PUEs; the TV network includes a TV Tower and TV Ues 1 and 2. In a conventional communication, the LTE-LAN Ues 1 and 2 may communicate with the LTE-LAN BS or with each other via the LTE-LAN BS only in a licensed spectrum rather than in an unlicensed spectrum as licensed to and employed by the TV network. Therefore, it is convenient for network operators to manage and maintain such an LTE-LAN network, and no or only a little attention should be paid to interference from other unlicensed systems.

However, to better use-efficiency of radio spectra and decrease spectral costs, LTE-LAN Ues 1 and 2 should, as appropriate, also use the TV white space spectrum as unused by the TV network. To minimize the interference to the licensed users (e.g., TV Ues 1 and 2) in the TV licensed spectrum, the LTE-LAN Ues 1 and 2 may need to perform precise or sometimes even complicated spectrum sensing first, and then determine, by taking the interference into account, whether they are allowed to communicate in the TV white space spectrum. In other words, the LTE-LAN Ues 1 and 2 are qualified for using the TV white space spectrum on the condition that they cause no interference to the TV Ues 1 and 2.

SUMMARY OF THE INVENTION

A straight forward way to achieve the above spectrum sensing is to instruct LTE-LAN Ues 1 and 2 that are in a non-idle mode (i.e., connected mode) to keep reporting results of the spectrum sensing to the LTE-LAN BS. This spectrum sensing behavior might, however, conflict with a UE's ongoing transmission, especially a UE with a single RF chain or a limited number of RF chains. For example, in order to sense a potential spectrum (e.g., a licensed or license-exempt spectrum), the LTE-LAN Ues 1 and 2 would have to interrupt or suspend their transmission, regardless of UL or DL transmission. In a case where the spectrum sensing requires a high accuracy or lasts a relatively long time, such transmission interruption would engender decreased quality of service and degrade user experiences.

Therefore, there is a need in the art to provide for an efficient way of performing spectrum sensing on a spectrum such that ongoing transmission in a licensed spectrum would not be interrupted and thus user experiences would not be degraded.

In an exemplary embodiment of the present invention, a method is provided, which comprises receiving, at a user equipment, information regarding performing spectrum sensing. The method also comprises performing, based upon the information, the spectrum sensing by the user equipment in an idle mode. Further, the method comprises transmitting, by the user equipment out of the idle mode, to the base station a result of the spectrum sensing.

In one embodiment, the information relates to at least one characteristic of the spectrum sensing, and the at least one characteristic includes one of a duration of the spectrum sensing, a periodicity of the spectrum sensing, a target spectrum of the spectrum sensing, a list of target spectra of the spectrum sensing, a report time of a result of the spectrum sensing, a lifetime of a result of the spectrum sensing, and an identifier of the user equipment.

In another embodiment, the receiving the information comprises receiving the information from the base station via a broadcast message, and the method further comprises determining, by the user equipment, whether to perform the spectrum sensing based upon the identifier of the user equipment.

In an additional embodiment, the receiving the information comprises receiving the information via a dedicated radio resource control signaling message.

In a further embodiment, the result of the spectrum sensing further includes at least one of a time stamp which indicates when the spectrum sensing has been performed and location information regarding where the spectrum sensing has been performed.

In one embodiment, the method comprises prior to the transmitting the result of the spectrum sensing, determining, based upon the lifetime of the result of the spectrum sensing, whether the result of the spectrum sensing is valid; and transmitting a valid result to the base station.

In an additional embodiment, the transmitting the result of the spectrum sensing comprises transmitting the result of the spectrum sensing upon request from the base station.

In another exemplary embodiment of the present invention, a method is provided, which comprises transmitting information regarding performing spectrum sensing from a base station to a user equipment. The method also comprises receiving, at the base station, a result of the spectrum sensing performed by the user equipment in an idle mode based upon the information and transmitted by the user equipment out of the idle mode.

In another embodiment, the information relates to at least one characteristic of the spectrum sensing, and the at least one characteristic includes one of a duration of the spectrum sensing, a periodicity of the spectrum sensing, a target spectrum of the spectrum sensing, a list of target spectra of the spectrum sensing, a report time of a result of the spectrum sensing, a lifetime of a result of the spectrum sensing, and an identifier of the user equipment.

In an additional embodiment, the method further comprises, subsequent to the receiving the result of the spectrum sensing, determining, based upon the lifetime of the result of the spectrum sensing, whether the result is valid.

In a further embodiment, the transmitting the information comprises transmitting the information to the user equipment via a broadcast message or a dedicated radio resource control signaling message.

In an additional exemplary embodiment of the present invention, an apparatus is provided, which comprises means for receiving, at a user equipment, information regarding performing spectrum sensing from a base station. The apparatus also comprises means for performing, based upon the information, the spectrum sensing by the user equipment in an idle mode. In addition, the apparatus comprises means for transmitting, by the user equipment out of the idle mode, to the base station a result of the spectrum sensing.

In one exemplary embodiment of the present invention, an apparatus is provided, which comprises at least one processor and at least one memory including computer program code. The memory and the computer program code are configured to cause the apparatus to receive, at a user equipment, information regarding performing spectrum sensing from a base station. The memory and the computer program code are also configured to cause the apparatus to perform, based upon the information, the spectrum sensing by the user equipment in an idle mode. Further, the memory and the computer program code are also configured to cause the apparatus to transmit, by the user equipment out of the idle mode, to the base station a result of the spectrum sensing.

In another exemplary embodiment of the present invention, an apparatus is provided, which comprises means for transmitting information regarding performing spectrum sensing from a base station to a user equipment. The apparatus also comprises means for receiving, at the base station, a result of the spectrum sensing performed by the user equipment in an idle mode based upon the information and transmitted by the user equipment out of the idle mode.

In another exemplary embodiment of the present invention, an apparatus is provided, which comprises at least one processor and at least one memory including computer program code. The memory and the computer program code are configured to cause the apparatus to transmit information regarding performing spectrum sensing from a base station to a user equipment. The memory and the computer program code are also configured to cause the apparatus to receive, at the base station, a result of the spectrum sensing performed by the user equipment in an idle mode based upon the information and transmitted by the user equipment out of the idle mode.

In another exemplary embodiment of the present invention, a computer program product is provided, which, comprises at least one computer readable storage medium having a computer readable program code portion stored thereon. The computer readable program code portion comprises program code instructions for receiving, at a user equipment, information regarding performing spectrum sensing from a base station. The computer readable program code portion also comprises program code instructions for performing, based upon the information, the spectrum sensing by the user equipment in an idle mode. Further, the computer readable program code portion comprises program code instructions for transmitting, by the user equipment out of the idle mode, to the base station a result of the spectrum sensing.

In one exemplary embodiment of the present invention, a computer program product is provided, which, comprises at least one computer readable storage medium having a computer readable program code portion stored thereon. The computer readable program code portion comprises program code instructions for transmitting information regarding performing spectrum sensing from a base station to a user equipment. The computer readable program code portion also comprises program code instructions for receiving, at the base station, a result of the spectrum sensing performed by the user equipment in an idle mode based upon the information and transmitted by the user equipment out of the idle mode.

According to certain embodiments of the present invention, because performance of the spectrum sensing is limited only to idle user equipments, transmission interruption caused by the non-idle user equipments performing the spectrum sensing would be eliminated and nonexistent any more. Further, because the base station is enabled to flexibly configure characteristics of the spectrum sensing, the spectrum sensing can be efficiently accomplished. In addition, by means of efficient spectrum sensing, flexibility and efficiency of use of the spectral resources will be ameliorated.

Other features and advantages of the embodiments of the present invention will also be understood from the following description of specific embodiments when read in conjunction with the accompanying drawings, which illustrate, by way of example, the principles of embodiments of the present invention.

BRIEF DESCRIPTION OF THE DRAWINGS

The embodiments of the invention that are presented in the sense of examples and their advantages are explained in greater detail below with reference to the accompanying drawings, in which.

DETAILED DESCRIPTION OF EMBODIMENTS

Embodiments of the present invention propose an efficient mechanism of spectrum sensing, which generally involves sensing strategy configuring, spectrum sensing, and sensing results reporting procedures. In particular, with respect to a UE with a single RF chain or limited number of RF chains, the BS that is in connection with the UE informs the UE of the sensing strategy, i.e., information regarding pre-configurable characteristics of the spectrum sensing. Due to connection with the BS, the UE now is in a non-idle mode and not allowed to perform the spectrum sensing; otherwise, a potential and unwanted transmission interruption may occur. When the UE disconnects the communication with the BS (e.g., call ended) and enters into an idle mode, it will perform the spectrum sensing with its available RF chain on a spectrum (e.g., a potential licensed or license-exempt spectrum) which may be specified by the above information. After completion of the spectrum sensing, the UE will report to the BS results of the spectrum sensing in several different manners, such as a network-triggered manner, a UE-triggered manner, and a forced-reporting manner, as will be discussed in depth later.

Embodiments of the present invention will be described in detail as below.

Figure 1:
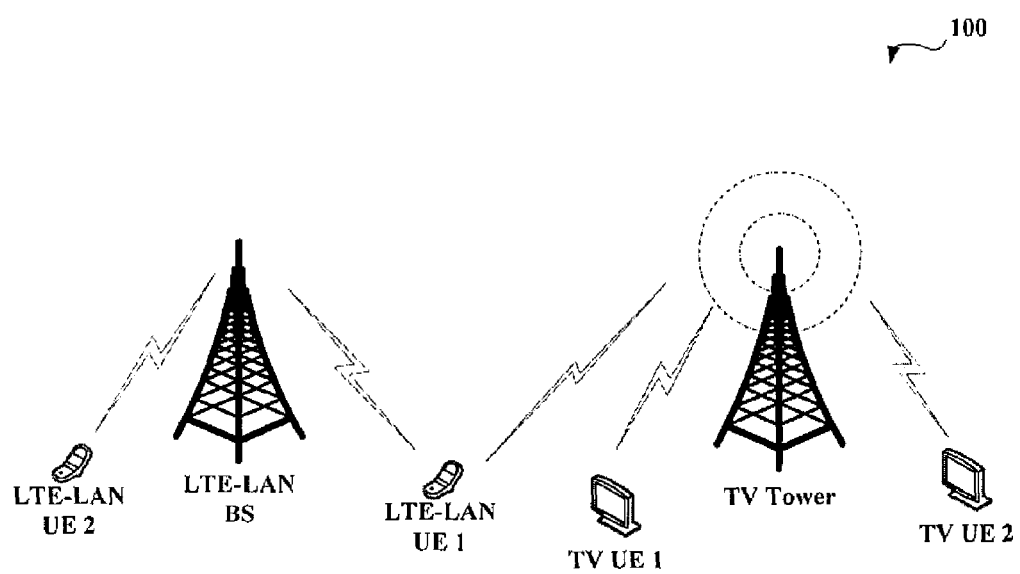
FIG. 1 is a schematic diagram illustrating a scenario in which an LTE-LAN network may operate in a license-exempt spectrum including a TV white space spectrum.

FIG. 1 is a schematic diagram illustrating a scenario in which an LTE-LAN network may operate in a licensed spectrum and may further operate in a license-exempt spectrum if allowed. Because description in connection with FIG. 1 has been made previously, further description or explanation is omitted herein for conciseness.

Figure 2:
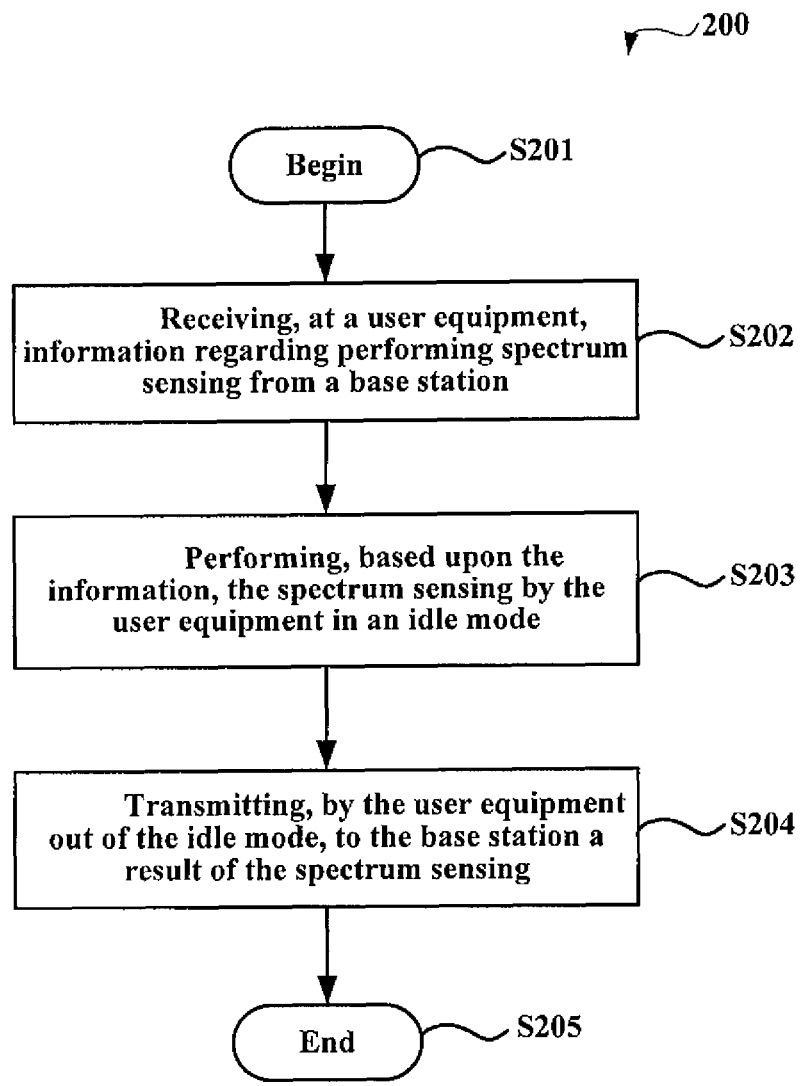
FIG. 2 is a flow chart schematically illustrating a method for performing spectrum sensing on a spectrum from a UE perspective according to an embodiment of the present invention.

FIG. 2 is a flow chart schematically illustrating a method 200 for performing spectrum sensing on a spectrum from a UE perspective according to an embodiment of the present invention. As illustrated in FIG. 2, the method 200 begins at step S201 and proceeds to step S202 at which the method 200 receives at a UE, information regarding performing spectrum sensing from a BS. In some embodiments, the information relates to at least one characteristic of the spectrum sensing, and the at least one characteristic includes one of a duration of the spectrum sensing, a periodicity of the spectrum sensing, a target spectrum of the spectrum sensing, a list of target spectra of the spectrum sensing, a report time of a result of the spectrum sensing, a lifetime of a result of the spectrum sensing, and an identifier of the UE.

Although not illustrated in FIG. 2, in some embodiments, the method 200 receiving the information at step S202 receives the information from the BS via a broadcast message, and the method 200 further determines, by the UE, whether to perform the spectrum sensing based upon the identifier of the UE. In some embodiment, the method 200 receiving the information at step S202 receives the information via a dedicated radio resource control signaling message.

Upon receipt of the above information, the method 200 proceeds to step S203 at which the method 200 performs, based upon the information, the spectrum sensing by the UE in an idle mode.

Afterwards, the method 200 advances to step S204, at which the method 200 transmits, by the UE out of the idle mode, to the BS a result of the spectrum sensing. In some embodiments, the result of the spectrum sensing further includes at least one of a time stamp which indicates when the spectrum sensing has been performed and location information regarding where the spectrum sensing has been performed. In some embodiments, the method 200 further determines, prior to the transmitting the result of the spectrum sensing at step S204, based upon the lifetime of the result of the spectrum sensing, whether the result of the spectrum sensing is valid and transmitting a valid result to the BS. In some embodiments, the transmitting at step S204 is upon a request from the BS.

Finally, the method 200 ends at step S205.

Figure 3:
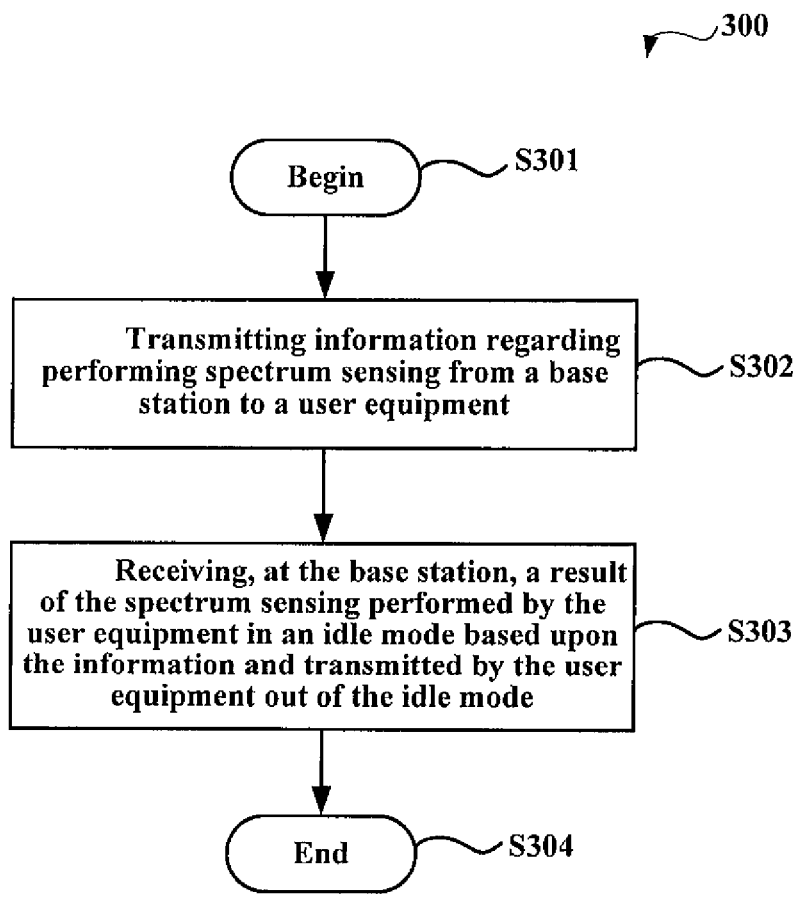
FIG. 3 is a flow chart schematically illustrating a method for performing spectrum sensing on a spectrum from a BS perspective according to another embodiment of the present invention.

FIG. 3 is a flow chart schematically illustrating a method for performing spectrum sensing on a spectrum from a BS perspective according to another embodiment of the present invention. As illustrated in FIG. 3, the method 300 begins at step S301 and proceeds to step S302 at which the method 300 transmits information regarding performing spectrum sensing from a BS to a UE. In some embodiment, the information relates to at least one characteristic of the spectrum sensing, and the at least one characteristic includes one of a duration of the spectrum sensing, a periodicity of the spectrum sensing, a target spectrum of the spectrum sensing, a list of target spectra of the spectrum sensing, a report time of a result of the spectrum sensing, a lifetime of a result of the spectrum sensing, and an identifier of the user equipment.

After transmitting the information to the user equipment, the method 300 proceeds to step S303, at which the method 300 receives, at the BS, a result of the spectrum sensing performed by the UE in an idle mode based upon the information and transmitted by the UE out of the idle mode. In some embodiments, the method 300, subsequent to the receiving the result of the spectrum sensing at step 303, determines, based upon the lifetime of the result of the spectrum sensing, whether the result of the spectrum sensing is valid. In some embodiments, the method 300 transmitting the information at step S302 transmits the information to the UE via a broadcast message or a dedicated radio resource control signaling message.

Finally, the method 300 ends at step S304.

With the methods 200 and 300 as illustrated and discussed above, the spectrum sensing according to embodiments of the present invention can be customized or configured, leading to flexible and efficient spectrum sensing. Further, because the spectrum sensing is performed only by the idle mode Ues, no ongoing transmission would be interrupted. Additionally, it should be noted that for a purpose of conciseness, details regarding how to sense a spectrum are omitted herein. A person skilled in the art can apply any suitable spectrum sensing methods (e.g., simply by measuring the signal energy in a licensed or license-exempt spectrum) to perform the sensing together with the methods according to the embodiments of the present invention.

Figure 4:
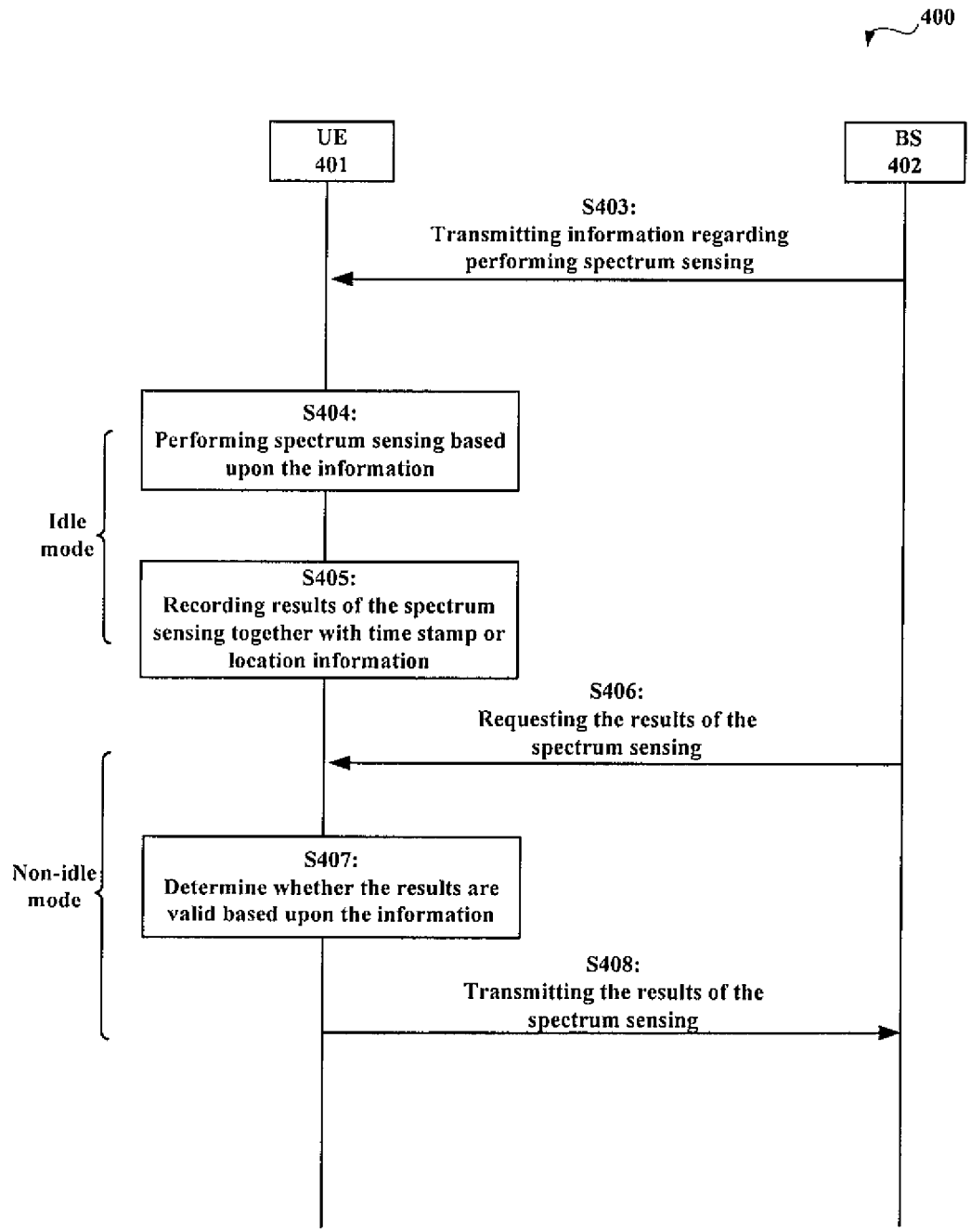
FIG. 4 is a flow chart schematically illustrating a method for performing spectrum sensing on a spectrum according to an embodiment of the present invention.

FIG. 4 is a flow chart schematically illustrating a method 400 for performing spectrum sensing on a spectrum according to an embodiment of the present invention. As illustrated in FIG. 4, the method 400 begins at step S403 wherein the LTE-LAN BS 402 transmits information regarding performing the spectrum sensing to the LTE-LAN UE 401, which is about to perform the spectrum sensing. As discussed before, the information may, for example, relate to at least one characteristic of the spectrum sensing, and the at least one characteristic may include one of a duration of the spectrum sensing, a periodicity of the spectrum sensing, a target spectrum of the spectrum sensing, a list of target spectra of the spectrum sensing, a report time of a result of the spectrum sensing, a lifetime of a result of the spectrum sensing, an identifier of the UE or the like. In other words, the spectrum sensing to be performed can be customized or configured to meet requirements of the BS 402 or a higher layer entity, e.g., a gateway entity.

Take the duration of the spectrum sensing as an example. When the duration is concretely specified in the information, the UE 401 will perform the spectrum sensing within this duration. Once the duration expires, the UE 401 will stop the spectrum sensing until a next round of the spectrum sensing so as not to unnecessarily waste its power. Again, take the target spectrum of the spectrum sensing as an example. When a specific target spectrum is indicated in the information, the UE 401 will perform the spectrum sensing directed to this target spectrum and neglect other potential spectra, thereby giving the efficiency of the spectrum sensing a boost. Further, for the lifetime of the result of the spectrum sensing, this lifetime refers to a time value preset by the BS 402 and used to evaluate whether the result is valid. If the time span between the time when the result is obtained and the time when the BS 401 receives the result or the time when the UE 401 transmits the result is larger than or equal to the lifetime, then it can be determined that the result in question is invalid and thus useless.

Regarding the transmitting at step S403, the BS 402 may accomplish it by means of a broadcast message (i.e., a system information broadcast message) or a dedicated RRC signaling message directed to the UE 401. When the information regarding performing the spectrum sensing is transmitted or broadcasted via a broadcast message, all Ues that have sensing capabilities and camp in the cell covered by the BS 402 will receive the information, although FIG. 4 only illustrates one UE, i.e., the UE 401. When the information regarding performing the spectrum sensing is transmitted via a dedicated RRC signaling message, only intended Ues would perform the spectrum sensing on a spectrum when they enter into an idle mode in which Ues may, for example, operate at a low power level and monitor certain channels.

Upon successful receipt of the information from the BS 402, the method 400 proceeds to step S404, at which the UE 401, which enters into an idle mode from a previous non-idle mode, performs, based upon the received information, the spectrum sensing (or spectrum measuring) on a spectrum, e.g., a license-exempt spectrum such as a TV white space spectrum, as noted above. Although not illustrated in FIG. 4, due to different manners of transmission of the information to the UE 401, the UE 401, which now is in the idle mode, may perform the spectrum sensing differently.

For the information transmitted by the BS via a broadcast message, all the idle Ues that have received the information will perform the spectrum sensing on a spectrum, e.g., a target spectrum. If the information includes a list of the target spectra, then all the idle Ues will perform the spectrum sensing on each target spectrum in the list. Additionally or alternatively, if the information includes respective identifiers (e.g., respective IMSIs) of some but not all Ues, then only those identified Ues may participate in performing the spectrum sensing on a spectrum.

For the information transmitted by the BS via a dedicated RRC signaling message, the UE, which is designated by the dedicated RRC signaling, will perform, based upon the information, the spectrum sensing on a spectrum when it is in an idle mode. In other words, by the RRC signaling message, the BS can preselect one or more Ues to perform the spectrum sensing. To facilitate preselection, the Ues may report their sensing capabilities to the BS in advance. For example, these sensing capabilities can be included in the Ues' radio capabilities which are reported to the network during an Attach procedure. Accordingly, the BS may transmit the dedicated RRC signaling only to those Ues with the sensing capability.

Upon completion of the spectrum sensing by the UE 401 in the idle mode, the method 400 advances to step S405, at which the UE 401 records a result of the spectrum sensing, optionally or preferably, with at least one of a time stamp or location information. The time stamp indicates when the spectrum sensing has been performed and the location information indicates where the spectrum sensing has been performed. Regarding the location information, it can be obtained via geo-positioning methods including, e.g., a GPS-based method or a cellular tri-angular based method.

After recording the results of the spectrum sensing performed by the UE 401 in the idle mode, the method 400 should perform transmitting the results to the BS 402. It should be noted that in order to transmit the results to the BS 402, a communication connection from the UE 401 to the BS 402 should be established first. Because the communication connection can be established in different manners, transmitting the results to the BS 402 can be accomplished in correspondingly different manners, e.g., a network-triggered manner which is illustrated in FIG. 4, a UE-triggered manner, and a forced-reporting manner.

For example, in the network-triggered manner as illustrated in FIG. 4, the BS 402 or a higher layer network entity via the BS 402 initiates or triggers a communication connection with the UE 401 and requests the results of the spectrum sensing at step S406. In such a network-triggered manner, the BS 402 can use a paging channel to trigger the connection with the UE 401. Upon establishment of the connection with the UE 401, the BS 402 can poll the UE 401 to report the sensing results. From the network's perspective, it might mean that a new NAS cause value is created for the paging.

Upon receiving the request or poll from the BS 402, additionally or alternatively, the method proceeds to step 5407, at which the UE 401 determines whether the result is valid based upon the lifetime of the result as specified by the BS 402 in the aforementioned information. For example, the UE 401 may calculate the time difference between the time when the result is obtained and the time when the result is about to be transmitted. If the time difference is larger than or equal to the lifetime, then it can be determined that the result is invalid, and thus the UE 401 will not transmits this invalid result. Otherwise, the method 400 advances to step S408 at which the UE 401 transmits a valid result to the BS 402. Base upon the result, the BS 402 may determine and proceed with communicating with the UE 401 in the sensed spectrum, which will not be discussed so as to avoid unnecessarily obscuring the embodiments of the present invention.

As pointed out above, in addition to the network-triggered manner, the method 400 may also transmit the result to the BS 402 in the UE-triggered manner or the forced-reporting manner, which is not illustrated in FIG. 4 and will be discussed in detail as below.

In the UE-triggered manner, the UE 401 may perform a best-effort reporting mechanism after a connection between the UE 401 and the BS 402 has been established. In other words, after the connection which is not dedicated to transit the result has been established, the UE 401 will try its best to transmit the result to the BS 402 via the connection. For example, during initiation of the connection establishment, the UE 401 sends a sensing-result-available indication to the BS 402 based upon a validity check as similar to one as illustrated in step S407. Upon receipt of a positive response to this indication from the BS 402, the UE 401 transmits the result to the BS 402. Alternatively, the UE 401 does not evaluate validity of the result; rather, evaluation of the validity of the result will be left to the BS 402. In other words, upon receipt of the latest result (preferably, with at least one of a time stamp and location information), the BS 402 will determine the validity of the result on its own based upon, e.g., a lifetime as preset.

Different from the UE-triggered manner, in the forced-reporting manner, the
UE 401 may report the result of the spectrum sensing once it is available and meets the at least one characteristic of the spectrum sensing, e.g., a report time of a result of the spectrum sensing. When the report time expires, the UE 401 will voluntarily initiate or trigger a new RRC connection establishment procedure (thereby running out of the idle mode) with the BS 402. This can be achieved by reusing a current "Service Request" NAS cause value or introducing a new NAS cause value. Afterwards, availability information regarding the result or the result itself can be transmitted to the BS 402 via the dedicated established connection. In addition, evaluation similar to those as discussed with two other manners is also applicable to the forced-reporting manner and thus description regarding the validity checking is omitted herein for conciseness.

The foregoing has discussed, in connection with FIG. 4, the method 400 which may involve further implemental details or variants of the methods 200 and 300; however, the present invention is not limited thereto. Further, it should be noted herein that the steps and execution order as illustrated FIG. 4 are only examples and are not restrictive to the present invention. Those skilled in the art, after reading the present specification, can change these steps, for example, by omitting, combining, or adding certain steps, changing the execution order of certain steps so as to adapt to different application demands. For example, step S407 can be performed in the idle-mode and thus the order of steps S407 and S405 can be switched. Additionally, the embodiments of the present invention can be advantageously applied to sense any suitable spectrum, including but not limited to a spectrum provided under "ASA" or a license-exempt spectrum.

Figure 5:
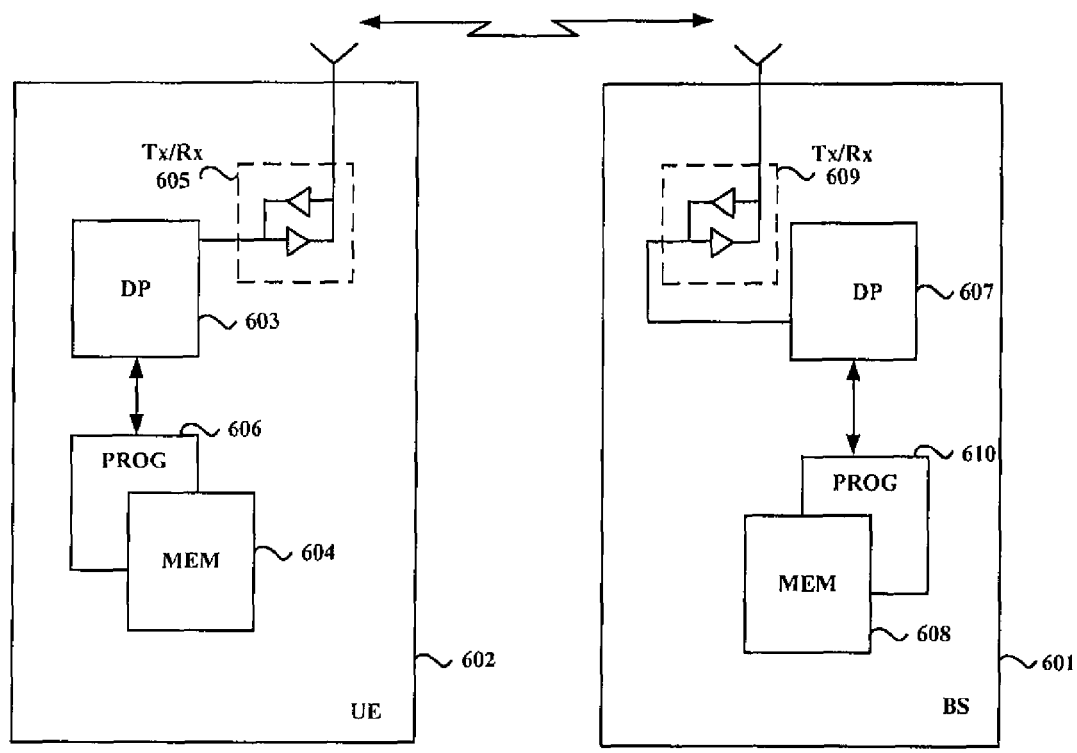
FIG. 5 is a schematic block diagram of a BS and a UE that are suitable for use in practicing the exemplary embodiments of the present invention.

FIG. 5 illustrates a simplified block diagram of a BS 601 and a UE 602 that are suitable for use in practicing the exemplary embodiments of the present invention. In FIG. 5, a wireless network is adapted for communication with the UE 602, referred to in the above examples as an LTE-LAN UE, via the BS 601, referred to in the above examples as an LTE-LAN BS (or eNB). The UE 602 includes a data processor (DP) 603, a memory (MEM) 604 coupled to the DP 603, and a suitable RF transmitter TX and receiver RX 605 (which need not be implemented in a same component) coupled to the DP 603. The MEM 604 stores a program (FROG) 606. The TX/RX 605 is for bidirectional wireless communications with the BS 601. Note that the TX/RX 605 has at least one antenna to facilitate communication; multiple antennas may be employed for multiple-input multiple-output MIMO communications in which case the UE 602 may have multiple TXs and/or RXs.

The BS 601 includes a data processor (DP) 607, a memory (MEM) 608 coupled to the DP 607, and a suitable RF transmitter TX and receiver RX 609 coupled to the DP 607. The MEM 608 stores a program (PROG) 610. The TX/RX 609 is for bidirectional wireless communications with the UE 602. Note that the TX/RX 609 has at least one antenna to facilitate communication, though in practice a BS will typically have several. The BS 601 may be coupled via a data path to one or more external networks or systems, such as the Internet, for example.

At least one of the PROGs 606 and 610 is assumed to include program instructions that, when executed by the associated DPs 603 and 607, enable the UE 602 and BS 601 to operate in accordance with the exemplary embodiments of this invention, as discussed herein with the methods 200, 300, or 400.

In general, the various embodiments of the UE 602 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of the present invention may be implemented by computer software executable by one or more of the DPs 603, 607 of the UE 602 and the BS 601, or by hardware, or by a combination of software and hardware.

The MEMs 604 and 608 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the BS 601 or UE 602, there may be several physically distinct memory units in the BS 601 or UE 602. The DPs 603 and 607 may be of any type suitable to the local technical environment, and may include one or more of general purpose computers, special purpose computers, microprocessors, digital signal processors (DSPs) and processors based on multicore processor architecture, as non limiting examples. Either or both of the UE 602 and the BS 601 may have multiple processors, such as for example an application specific integrated circuit chip that is slaved in time to a clock which synchronizes the main processor.

Exemplary embodiments of the present invention have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment of the invention comprises at least one computer readable storage medium, on which the foregoing computer program instructions are stored. The computer readable storage medium can be, for example, an optical compact disk or an electronic memory device like a RAM (random access memory) or a ROM (read only memory).

Various abbreviations that appear in the specification and/or in the drawing figures are defined as below:
BS Base Station
eNB evolved Node B
LAN Local Area Network
FBS Femtocell Base Station
PBS Picocell Base Station
UE User Equipment
FUE Femtocell User Equipment
PUE Picocell User Equipment
RRC Radio Resource Control
GPS Global Positioning System
DL Downlink
UL Uplink RF Radio Frequency
NAS None-Access Stratum
IMSI International Mobile Subscriber Identity
ASA Authorized Shared Access Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method, comprising:
   receiving, at a user equipment, information regarding performing spectrum sensing;
   performing the spectrum sensing of the licensed portion of the spectrum, when the user equipment is in a non-idle mode and the information indicates spectrum sensing of the licensed portion of the spectrum;
   delaying to when the user equipment is in an idle mode, performance of the spectrum sensing in the license-exempt portion of the spectrum, when the information indicates spectrum sensing of the license-exempt portion of the spectrum; and
   transmitting, by the user equipment, to a base station a result of the spectrum sensing in the license-exempt portion of the spectrum, when the user equipment is no longer in idle mode.

2. The method as recited in claim 1, wherein the information relates to at least one characteristic of the spectrum sensing, and the at least one characteristic includes one of a duration of the spectrum sensing, a periodicity of the spectrum sensing, a target spectrum of the spectrum sensing, a list of target spectra of the spectrum sensing, a report time of a result of the spectrum sensing, a lifetime of a result of the spectrum sensing, and an identifier of the user equipment, wherein the lifetime refers a time value preset by the base station and the spectrum sensing is determined to be valid when a timespan between the time when the result is obtained and the time when the UE transmits the result is less than or equal to said lifetime.

3. The method as recited in claim 2, further comprising:
   prior to the transmitting the result of the spectrum sensing, determining, based upon the lifetime, whether the result of the spectrum sensing is valid; and
   transmitting, when valid, the result to the base station, wherein the result of the spectrum sensing in the license-exempt portion of the spectrum is considered valid during the lifetime.

4. The method as recited in claim 2, wherein the receiving information comprises receiving information from the base station via a broadcast message, and the method further comprises:
   determining, by the user equipment, whether to perform the spectrum sensing based upon the identifier of the user equipment.

5. The method as recited in claim 1, wherein the receiving the information comprises receiving the information via a dedicated radio resource control signaling message.

6. The method as recited in claim 1, wherein the result of the spectrum sensing further includes location information regarding where the spectrum sensing was performed.

7. The method as recited in claim 1, wherein the transmitting the result of the spectrum sensing comprises transmitting the result of the spectrum sensing upon request from the base station.

8. The method as recited in claim 1, wherein the information is received from a base station.

9. An apparatus, comprising:
   at least one processor and at least one memory including computer program code,
   the memory and the computer program code are configured to, with the at least one processor, cause the apparatus to at least:
     receive information regarding performing spectrum sensing of a license-exempt portion of the spectrum;
     perform the spectrum sensing of the licensed portion of the spectrum, when the user equipment is in a non-idle mode and the information indicates spectrum sensing of the licensed portion of the spectrum;
     delay, to when the user equipment is in an idle mode, performance of the spectrum sensing in the license-exempt portion of the spectrum, when the information indicates spectrum sensing of the license-exempt portion of the spectrum; and
     transmit, by the apparatus, to a base station a result of the spectrum sensing in the license-exempt portion of the spectrum, when the apparatus is no longer in idle mode.

10. The apparatus as recited in claim 9, wherein the information relates to at least one characteristic of the spectrum sensing, and the at least one characteristic includes one of a duration of the spectrum sensing, a periodicity of the spectrum sensing, a target spectrum of the spectrum sensing, a list of target spectra of the spectrum sensing, a report time of a result of the spectrum sensing, a lifetime of a result of the spectrum sensing, and an identifier of the apparatus, wherein the lifetime refers a time value preset by the base station and the spectrum sensing is determined to be valid when a timespan between the time when the result is obtained and the time when the UE transmits the result is less than or equal to said lifetime.

11. The apparatus as recited in claim 10, wherein the apparatus is further caused to at least:
    prior to the transmitting the result of the spectrum sensing, determine, based upon the lifetime, whether the result of the spectrum sensing is valid; and
    transmit, when valid, the result to the base station, wherein the result of the spectrum sensing in the license-exempt portion of the spectrum is considered valid during the lifetime.

12. The apparatus as recited in claim 10, wherein the receiving information comprises receiving information from the base station via a broadcast message, and the apparatus is further caused to at least:
    determine whether to perform the spectrum sensing based upon the identifier of the apparatus.

13. The apparatus as recited in claim 9, wherein the receiving information comprises receiving information via a dedicated radio resource control signaling message.

14. The apparatus as recited in claim 9, wherein the result of the spectrum sensing further includes location information regarding where the spectrum sensing was performed.

15. The apparatus as recited in claim 9, wherein the transmitting the result of the spectrum sensing comprises transmitting the result of the spectrum sensing upon request from the base station.

16. An apparatus, comprising:
at least one processor and at least one memory including compute program code,
the memory and the computer program code are configured to, with the at least one processor, cause the apparatus to at least:
  transmit information regarding performing spectrum sensing of a license-exempt portion of the spectrum, wherein the information is transmitted to a user equipment; and
  receive a result of the spectrum sensing performed in the license-exempt portion of the spectrum, wherein the user equipment performs the spectrum sensing based upon the transmitted information, wherein the user equipment performs the spectrum sensing of the licensed portion of the spectrum when the user equipment is in a non-idle mode and the information indicates spectrum sensing in the licensed portion of the spectrum, wherein the user equipment delays to when the user equipment is in an idle mode, performance of the spectrum sensing in the license-exempt portion of the spectrum when the information indicates spectrum sensing of the license-exempt portion of the spectrum, and wherein the result of the spectrum sensing is transmitted to the apparatus by the user equipment when the user equipment is no longer in idle mode.

17. The apparatus as recited in claim 16, wherein the information relates to at least one characteristic of the spectrum sensing, and the at least one characteristic includes one of a duration of the spectrum sensing, a periodicity of the spectrum sensing, a target spectrum of the spectrum sensing, a list of target spectra of the spectrum sensing, a report time of a result of the spectrum sensing, a lifetime of a result of the spectrum sensing, and an identifier of the user equipment, wherein the lifetime refers a time value preset by the base station and the spectrum sensing is determined to be valid when a timespan between the time when the result is obtained and the time when the UE transmits the result is less than or equal to said lifetime.

18. The apparatus as recited in claim 17, wherein the apparatus is further caused to at least: subsequent to the receiving the result of the spectrum sensing, determine, based upon the lifetime, whether the result is valid, wherein the result of the spectrum sensing in the license-exempt portion of the spectrum is considered valid during the lifetime.

19. The apparatus as recited in claim 16, wherein the transmitting information comprises transmitting information to the user equipment via a broadcast message or a dedicated radio resource control signaling message.

* * * * *